United States Patent [19]

Tsui et al.

[11] Patent Number: 5,266,006
[45] Date of Patent: Nov. 30, 1993

[54] WINDMILL WITH REMOVABLE WIND VANE PLATES ARRANGED IN MULTI-ROWS-AND-LINES

[76] Inventors: I-Hua Tsui; Cherng-Tay Tsui; Cheyng-Jiann Tsui, all of No. 17, Lane 316, Sec. 4, Hsi-Men Rd., Tainan, Taiwan

[21] Appl. No.: 22,455

[22] Filed: Feb. 25, 1993

[51] Int. Cl.$^5$ .............................................. B63H 3/00
[52] U.S. Cl. ..................... 416/119; 416/132 B; 416/DIG. 4
[58] Field of Search .................. 416/117, 119, 132 B, 416/DIG. 4, DIG. 6

[56] References Cited

U.S. PATENT DOCUMENTS

| | | | |
|---|---|---|---|
| 1,649,644 | 11/1927 | Alexeeff | 416/119 |
| 4,346,305 | 8/1982 | White | 416/119 |
| 4,422,825 | 12/1983 | Boswell | 416/119 |
| 4,545,729 | 10/1985 | Storm | 416/119 |
| 5,195,871 | 3/1993 | Hsech-Pen | 416/17 |

FOREIGN PATENT DOCUMENTS

| | | | |
|---|---|---|---|
| 0061236 | 4/1955 | France | 416/119 |
| 2289764 | 5/1976 | France | 416/119 |
| 2067670 | 7/1981 | United Kingdom | 416/17 |

Primary Examiner—Edward K. Look
Assistant Examiner—Mark Sgantzos

[57] ABSTRACT

A windmill with removable wind vane plates arranged in multiple rows and columns, comprising a base fixed firmly on the ground, a tubular post fitted upright in the base, a rotatable frame consisting of a rotatable tubular shaft fitting around the post and seated on the base. The windmill includes a plurality of wind vanes made of vane plate sashes with removable plates and fixed with the shaft to allow wind to blow against the plates to rotate the shaft to produce electricity via a generator.

3 Claims, 8 Drawing Sheets

WINDMILL WITH REMOVABLE WIND VANE PLATES ARRANGED IN MULTI-ROWS-AND-LINES

BACKGROUND OF THE INVENTION

Figure 1:
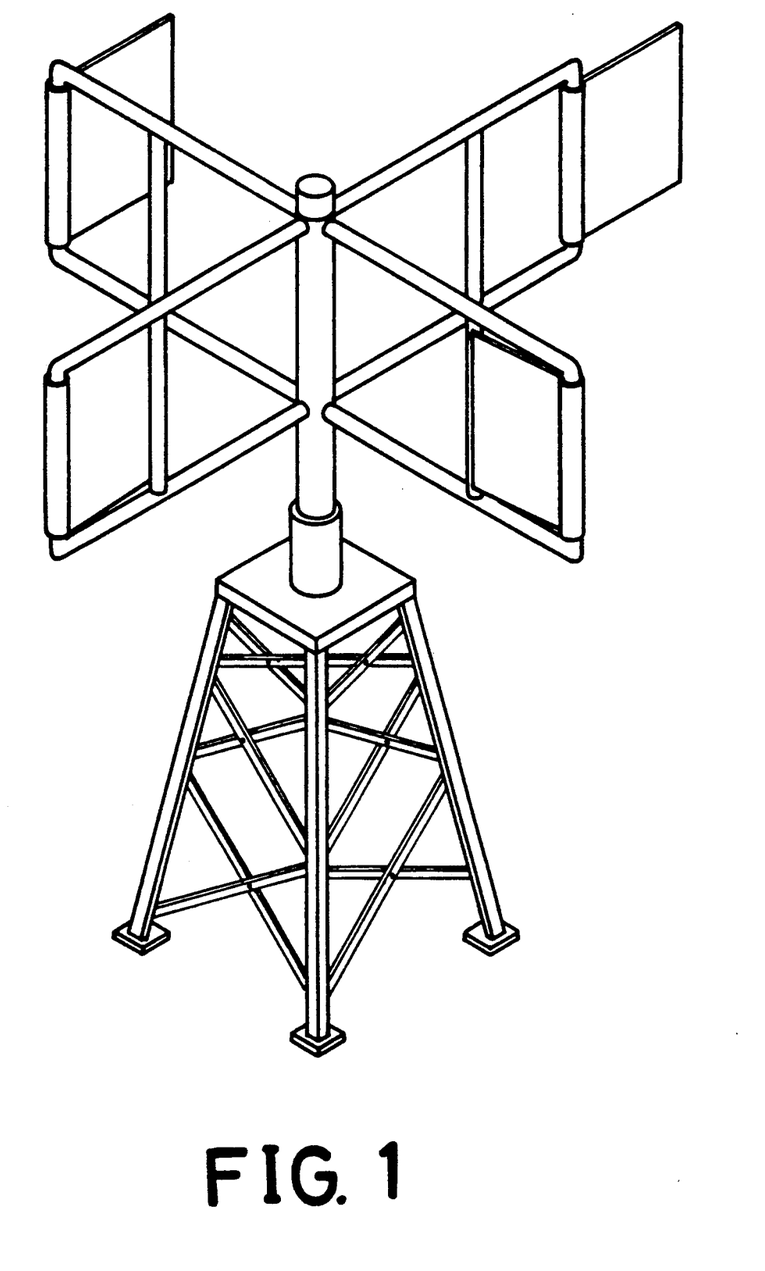
FIG. 1 is a conventional windmill with removable wind vane plates.

A conventional windmill with removable vane plates (shown in FIG. 1) comprises a plurality of vane plates arranged in only one row. This construction has a limited wind resistance and consequently a limited electric output from a generator connected to the windmill. If electric output is to be increased, the dimension of the wind vanes would have to be enlarged, involving danger of breakage caused by very strong wind. This conventional windmill is considered to have the following disadvantages:

1. Its electric power output is quite limited hardly meeting its cost.
2. If its wind vane is enlarged, its basic structure may not be strong enough to cope with a very strong wind, being subject to breaking or falling down.

SUMMARY OF THE INVENTION

A main object of this invention is to offer a kind of windmill which can automatically adjust the dimension of its wind vanes according to the strength of a wind, thus generating maximum electric power within safety bounds.

A main feature of the windmill of the present invention is a rotatable frame consisting of a rotatable tubular shaft fitted around a tubular post. The windmill further comprises a plurality of wind vanes having many rectangular vane plates fitted in multiple rows and columns of plate sashes. All the vane plates are of different width, gradually becoming wider and wider form the outermost to the innermost column and from the uppermost to the lowermost row so that all the vane plates except in the innermost column and in the lowermost row can be compressed to slide over from the front side to the rear side of their sashes to gradually decrease resistant dimensions of each wind vane in order to cope with a very strong wind. The movement of those vane plates in the innermost column and in the lowermost row is inhibited by two projections on the sashes to maintain minimum dimensions for resisting wind so that in case of a very strong wind, the windmill is not damaged, but still generates electricity.

DETAILED DESCRIPTION OF THE INVENTION

Figure 2:
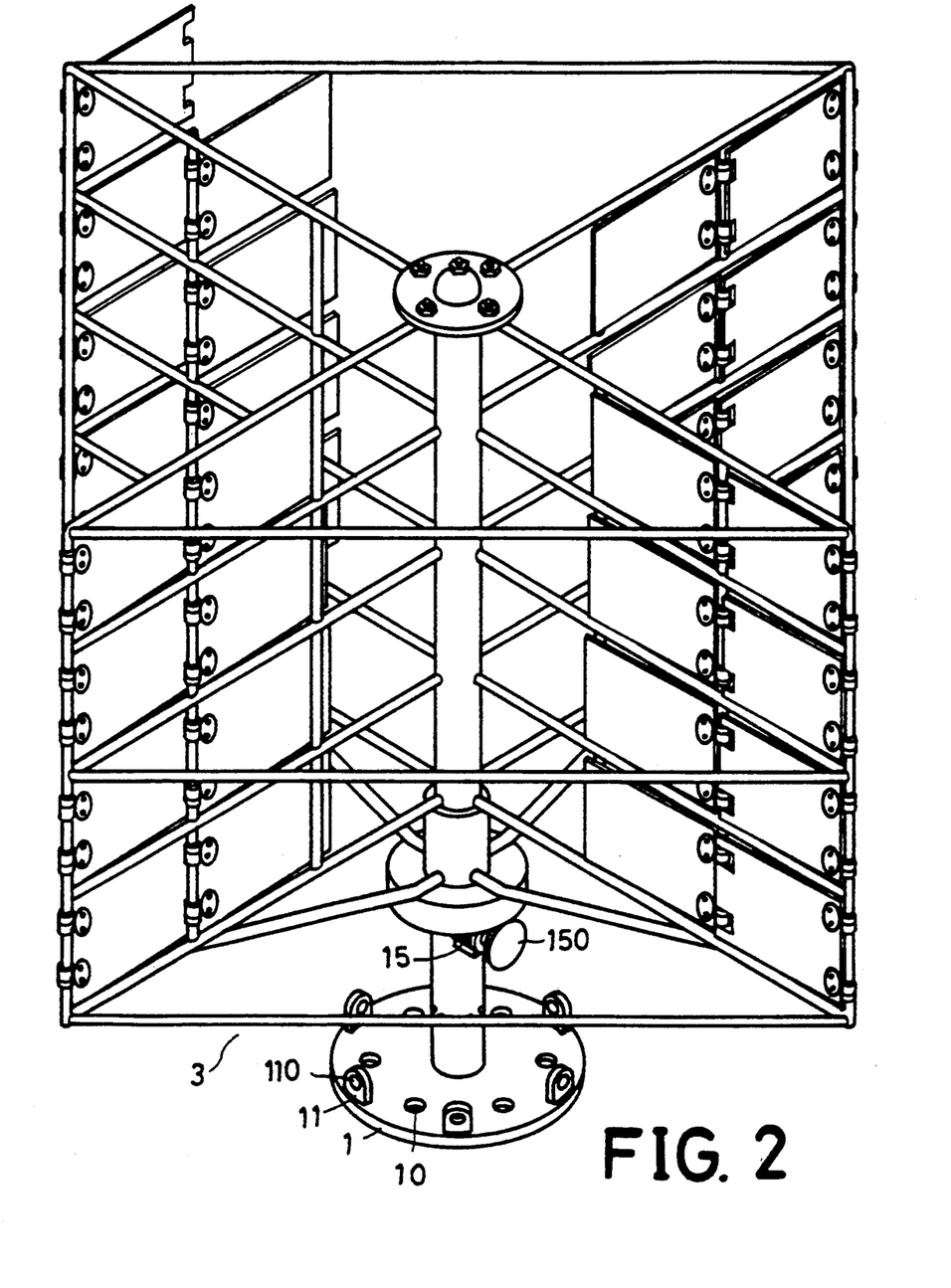
FIG. 2 is a perspective view of a windmill with removable vane plates in multiple rows and columns in the present invention.
Figure 3:
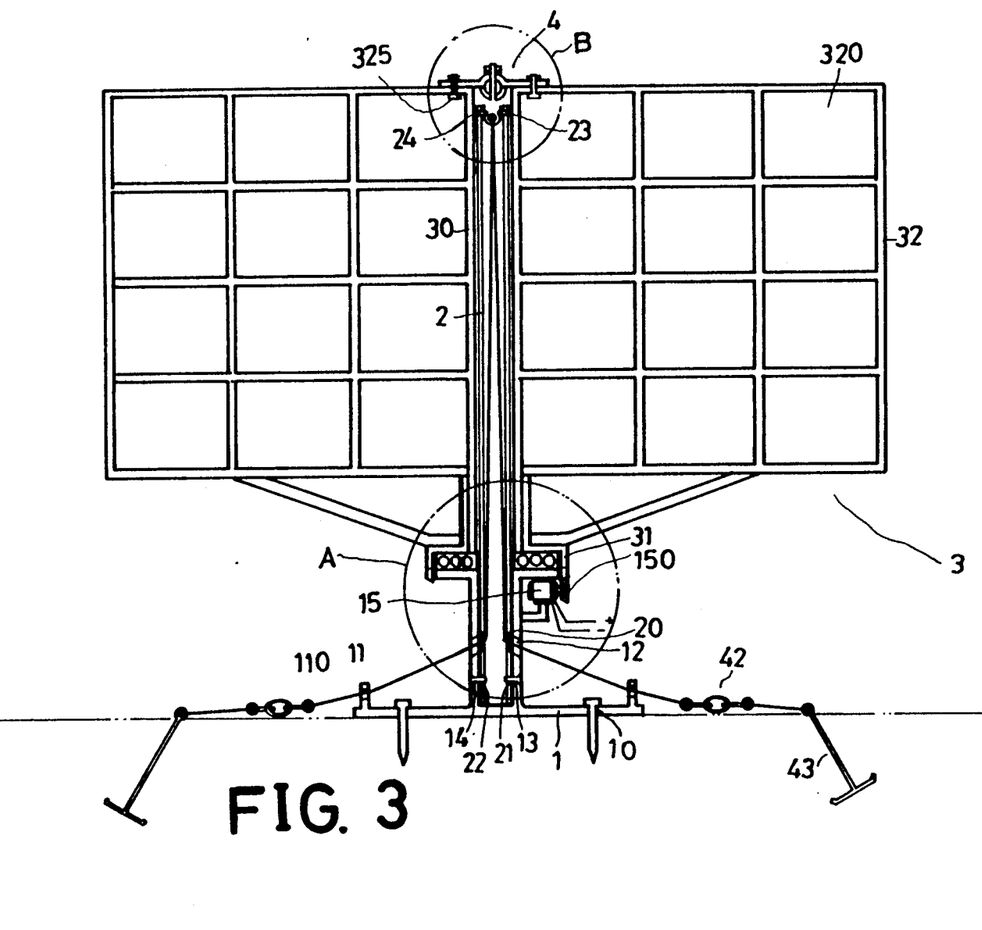
FIG. 3 is a cross-sectional view of the windmill with removable wind vane plates in multiple rows and columns of the present invention.

A windmill with removable vane plates in multiple rows and columns, as shown in FIGS. 2 and 3, comprises a base 1, a tubular post 2, a rotatable frame 3, a plurality of wind vanes 32, and a fixing unit 4 as its main components.

The base 1 is I-shaped, having an upright tubular portion, a top flat annular portion, and a bottom flat round annular portion. the bottom portion has a plurality of round holes 10 for anchor nails to pass through into the ground. each projection 11 has an outer rope hole 110. A number of inner rope holes 12 equal to the number of outer rope holes 110 are provided around the wall of the tubular portion. Two opposing screw holes 13, 14 are provided below the inner rope holes 12 in the wall of the tubular portion. A generator 15 is fixed with the outer surface of the wall of the tubular portion above the holes 12, having a bevel gear 150 on its shaft.

The tubular post 2 is fitted in the tubular portion of the base 1 and held firmly therein with screws to stand upright. The post 2 has sloped holes 20 communicating with the holes 12 in the base 1, two screw holes 21, 22 communicating with the screw holes 13, 14 and two opposing holes 23, 24 near a top end.

Figure 4:
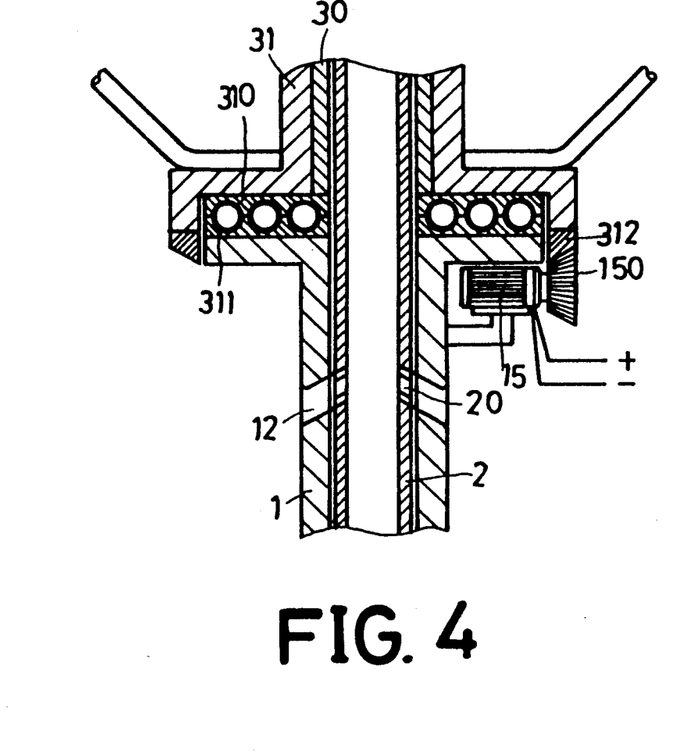
FIG. 4 is a cross-sectional view of the part marked A in FIG. 3.

The rotatable frame 3 is constructed to withstand high stress, having a rotatable tubular shaft 30 fitted around the post 2 and seated on the upper flat portion of the base 1. An inverted T-shaped supporter 31 is fixed on the top flat portion of the base 1, as shown in FIG. 4. In the annular space 310 of the supporter 31 and on the top flat portion of the base 1 are placed ball bearings 311 enabling the rotatable frame 3 to rotate around the post 2. The inverted T-Shaped supporter 31 has a bottom edge with a bevel gear 312 to engage with the bevel gear 150 of the generator 15.

Figure 5:
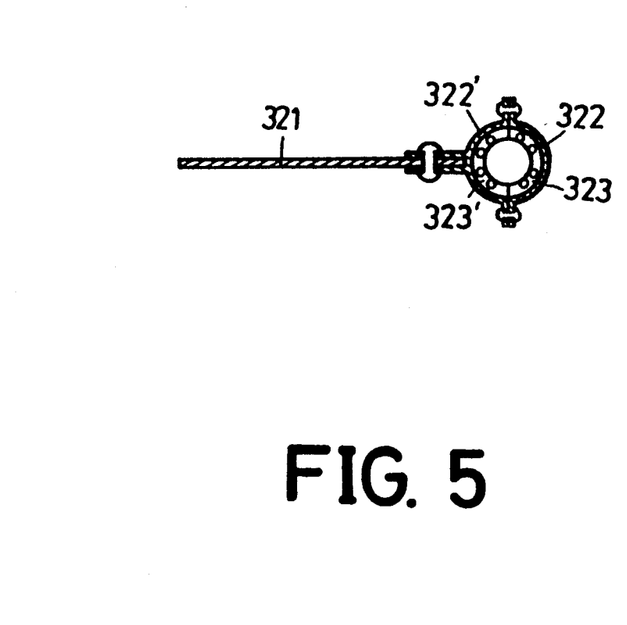
FIG. 5 is a front view of removable vane plates combined in a wind vane in the windmill of the present invention.

The plurality of wind vanes 32 are combined with the rotatable frame 3, extending outward horizontally from the rotatable tubular shaft 30 of the rotatable frame 3. Each wind vane 32 has multiple vane sashes 320 arranged in multiple rows and columns for fitting movable vane plates 321 as shown in FIGS. 2 and 5. The vanes 32 are pivotally fixed in each sash 320 by means of two pairs of semi-circular connectors 322, 322' which fit around two pairs of semi-circular bearings 323, 323' and are secured tightly with screws. Each connector 322, 322' is prevented from sliding by a limit ring 324 on or under it. Each plate 321 has its inner end in contact with the inner vertical bar of sash 320 to keep each plate 321 on the front side of each sash 320 except in high wind.

Figure 6:
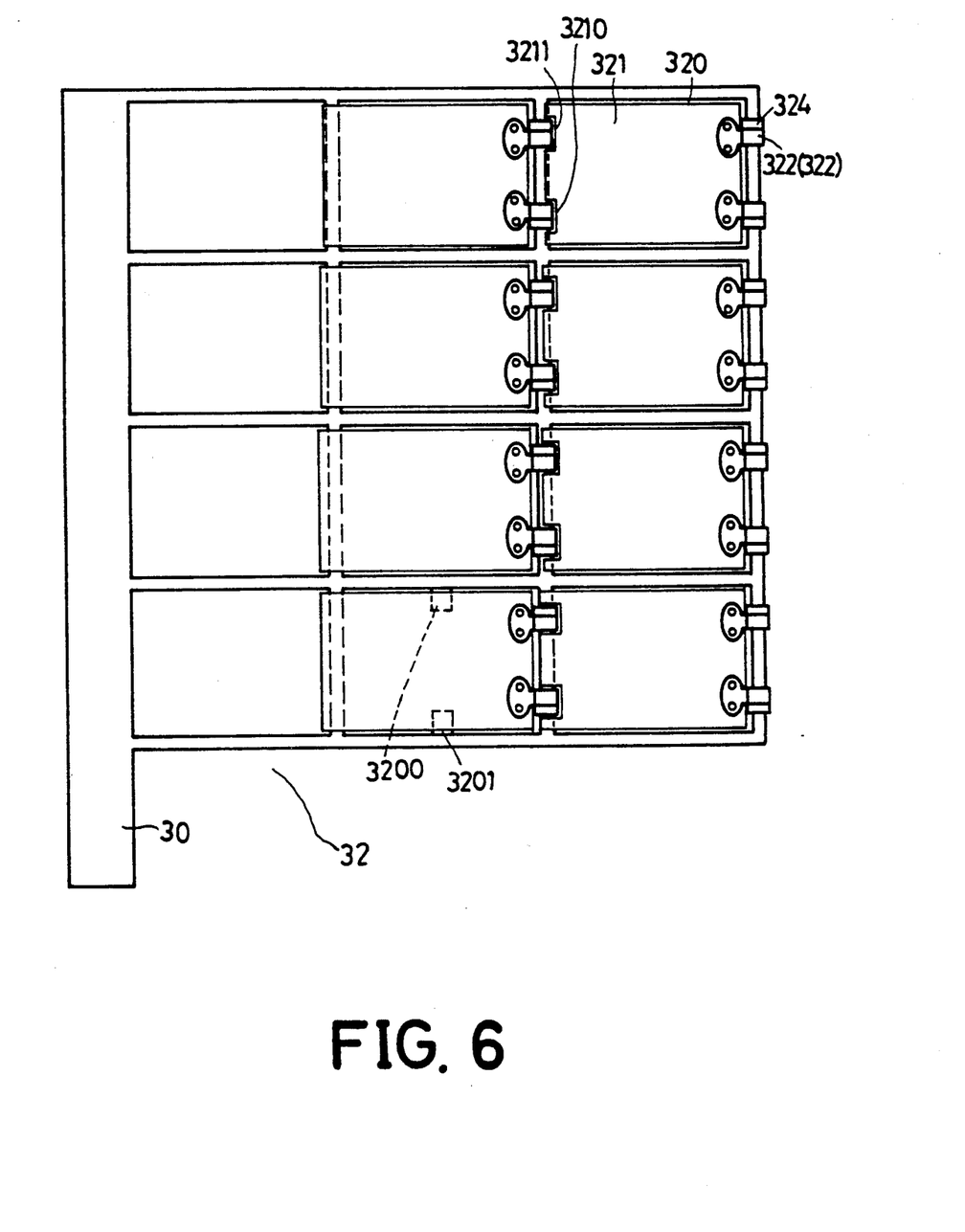
FIG. 6 is a cross-sectional view of a separate vane plate combined with a plate sash in the wind vane of the windmill of the present invention.

Each wind vane plate 321 in the outermost column of each wind vane 32 has two notches 3210, 3211 for the connectors 322, 322'. The vane plates 321 increase gradually in width from the outermost to the innermost column and from the uppermost to the lowermost row. The vane plates 321 can bend to have their inner edges slide over a left vertical bar of each sash when the wind force is strong, permitting the windmill to operate at the maximum output within the safety bounds of its structure. In order to prevent all of the wind vane plates 321 from sliding over to the rear side of the sashes and eliminating their wind force receiving function, the sashes 320 in the lowermost row are provided with a projection 3200 under an upper horizontal bar and another projection 3201 on a lower horizontal bar of each sash 320 to stop the vane plate 321 form sliding over to the rear side of the sash. A screw 326 is provided on a top end of the wind vane 32 to fix the wind vane to the fixing unit 4.

Figure 7:
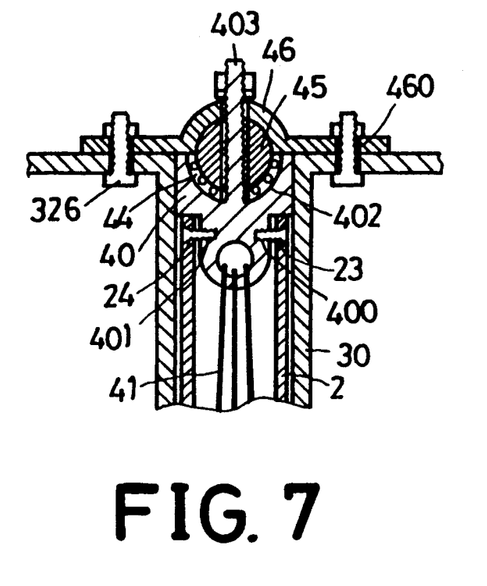
FIG. 7 is a magnified cross-sectional view of the part marked B in FIG. 3.
Figure 8:
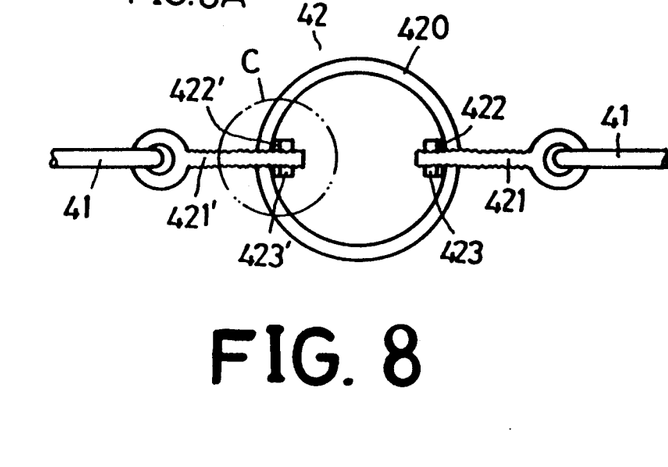
FIG. 8 is a front view of a rope tensions adjustor in the windmill of the present invention.
Figure 8A:
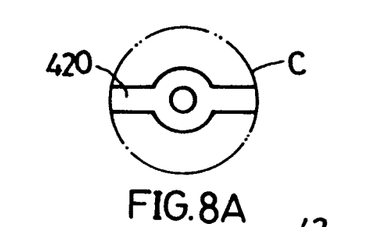

The fixing unite 4, as shown in detail in FIGS. 7 and 8, comprises a wire rope base 40 fitted and secured in a top end of the post 2 and having two screw holes 400, 401 in a lower portion, and a plurality of wire ropes 41 connected with its bottom. Each wire rope 41 extends through a sloped hole 20 in the post 2, then is connected to a tightness adjustor 42, which is in turn connected to an anchor 43 buried in the ground. the tightness adjustor 42 has a steel loop 420 connected to a threaded rod 421, 421' at two opposite sides and each threaded rod 421, 421' is connected to a wire rope 41. The threaded rods 421, 421' respectively have a washer 422, 422' and a nut 423, 423' engaging a top end inside the ring 420. The wire rope base 40 has a bowl shaped groove 402, a threaded rod 403 extending from the bottom of the groove 402, a bowl-shaped bearing 44, and a steel ball 45 in the groove 402. A cap 46 covers the steel ball, and has a plurality of round threaded holes 460 in its annular flat portion to engage the screws 326 of the rotating frame 3.

To assemble the windmill, first, the post 2 is inserted and secured with screws in the base 1. Then each of the wire ropes 41 has one of its ends inserted through the outer rope hole 110 in each projection 11, each inner rope hole 12 in the base a, and each sloped hole 20 in the post 2, and then fixed on the rope base 40, which is then fitted and secured with screws in the post 2. Next the base 1 and the tubular post 2 are placed and secured upright on the ground. After that, each wire rope 41 has its other end connected to the tightness adjustor 42, and the adjustor 42 is tightly connected with one of the anchors 43 buried in the ground, further securing the post 2. Then the nuts 423, 423' of all the tightness adjustors 42 are adjusted to make the steel loops 420 conform to the same tightness. The bearing 310 and the rotatable frame 3 are then fitted around the tubular post 2 from the top, standing on the base 2, with the bevel gear 312 engaging the bevel gear 150 of the generator 15. And lastly, the bowl-shaped bearing 44, the steel ball 45, and the cap 46 are mounted in order on the rope base 40 and secured with screws.

Figure 9:
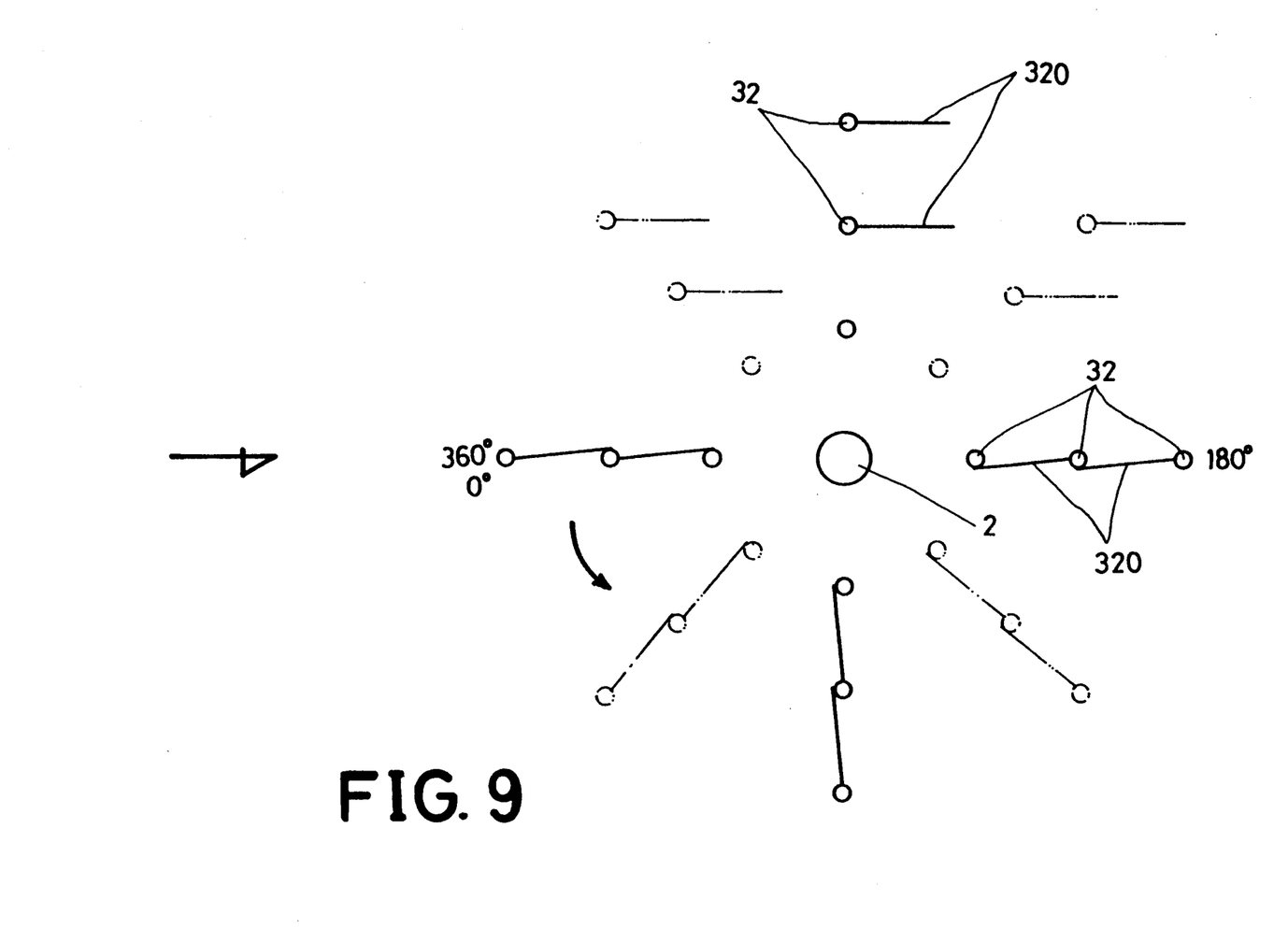
FIG. 9 is a diagram illustrating the physical theory of the windmill of the present invention.
Figure 10:
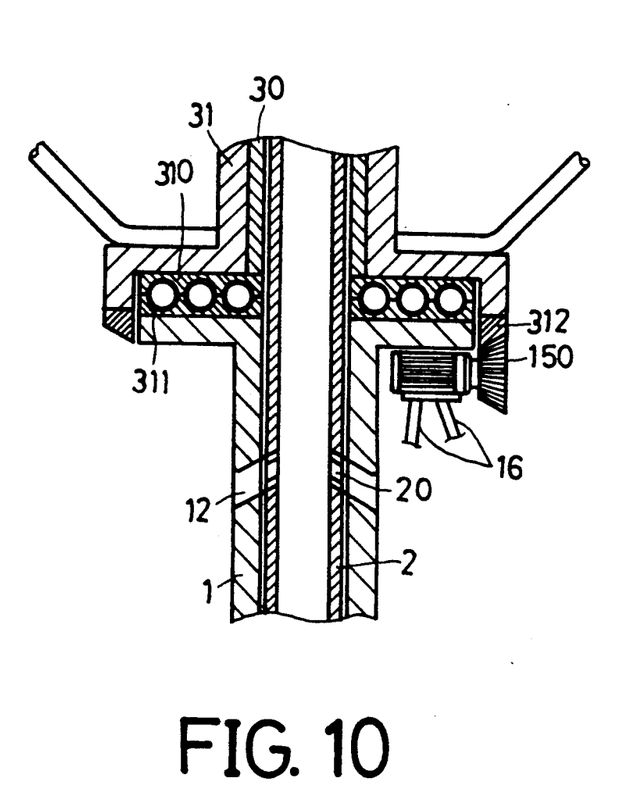

In use, as demonstrated in FIG. 9, after the wind blows and moves each wind vane 32 from 0° to force the rotatable frame 3 to rotate 180°, with the wind vane 32 resisting the wind force, all the wind vane plates 321 of the wind vane 32 then rotate without resisting the wind to 360°, where they then begin to resist the wind. In the meanwhile, the rotatable frame 3 is rotated one round, and the bevel gear 312 rotates the bevel gear 150 of the generator 15, which in turn generates electricity. It is recognized that, as shown in FIG. 10, a pump 16 could be substituted for the generator 15.

If the wind force is a little stronger than the maximum level that the wind vane plates 321 in the upper rows and in the outer columns can endure, the vane plates 321 bend to slide over the vertical bars of the sashes 320 to the rear side of the sash 320, so that they block no more of the wind. In this way, the stronger the wind becomes, the more vane plates 321 continue to bend to slide over the rear sides of the sashes 320 in order from the outermost column to the innermost column and also from the uppermost row to the lowermost row. However, even in very high winds, the vane plate 321 in the innermost column and the lowest row of the wind vane 32 are stopped by two projections 3200, 3201 and can resist wind to force the rotatable frame 3 to rotate to constantly operate the generator 15.

What is claimed is:

1. A windmill with movable vane plates arranged in multiple rows and columns comprising:

a base with a substantially I-shaped body and including a vertical tubular portion, an upper flat round portion, and a lower flat portion wherein the tubular portion includes a plurality of holes to accommodate wire ropes, the upper annular flat portion receives a bottom of an inverted T-shaped supporter of a rotatable frame, and the lower flat portion securely supports the rotatable frame; and a tubular post, a lower portion of the tubular post fitting into the vertical tubular portion of the base; the tubular post extending upward to a height sufficient to support a rotatable tubular shaft of the rotatable frame which includes a plurality of wind vanes, and which includes a plurality of sloped holes in the lower portion of the post to accommodate the wire ropes that communicate with the holes in the base; and a rotatable frame having a rotatable tubular shaft that fits around the tubular post, an inverted T-shaped tubular supporter fixed around the lower end portion of the rotatable tubular shaft and having an annular vertical wall and a bevel gear fixed on an end surface of the annular vertical wall to engage a bevel gear on a shaft of a generator, and further including a plurality of wind vanes fixed to the rotatable tubular shaft and having vane plate sashes arranged in multiple rows and columns, each vane plate sash having a vane plate fitted therein and held by connectors on one vertical side bar of the sash, a screw provided in an upper inner end of each wind vane to fix the wind vane to a fixing unit; and the fixing unit including a wire rope base fitting into a top end of the tubular post and having its bottom connected with a first end of multiple wire ropes which are connected to a tightness adjustor at their second ends, the tightness adjustor further communicating with an anchor buried in the ground, and the wire rope base having a bowl-shaped groove with a bowl-shaped bearing with a steel ball fitting therein, a threaded rod extending upward from said groove, and a cap fixed so as to cover the steel ball and secured to a top end of the rotatable tubular shaft with screws; and wherein each wind vane includes a plurality of rows and columns of plate sashes, a rectangular vane plate being fitted in each vane plate sash and increasing in width from the outer- and uppermost plates to the inner- and lower-most plates, the vane plates being pivotally attached to a first vertical side of the sashes, and the plates being flexible so that in high winds they slide past a second vertical side of the sashes thus reducing wind resistance; and wherein the sashes in the lowermost row and innermost column includes two projections to inhibit the plates from moving past the second vertical side so that the vanes maintain wind resistance even in very high winds so that the windmill provides constant electricity generation.

2. The windmill as claimed in claim 1 wherein:

the bevel gear fixed on an end surface of the annular vertical wall of the inverted T-shaped tubular supporter engages a bevel gear on a shaft of a pump.

3. The windmill as claimed in claim 1 wherein:

the tightness adjustor of the fixing unit includes a steel loop, two wire ropes connected via threaded rods on opposing sides of the fixing unit, a washer and a nut engaging an end of the threaded rod which extends inside the steel loop so that each nut may be used to adjust the tension of its corresponding wire rope, the tension being calculable by measurement of the length of the rod which extends inside the steel loop.

* * * * *